(12) United States Patent
Imade et al.

(10) Patent No.: US 10,275,015 B2
(45) Date of Patent: Apr. 30, 2019

(54) POWER SOURCE CONTROL METHOD, POWER SOURCE CONTROL APPARATUS, AND STORAGE MEDIUM

(71) Applicant: FUJITSU LIMITED, Kawasaki-shi, Kanagawa (JP)

(72) Inventors: Hiroaki Imade, Kawasaki (JP); Jun Moroo, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 15/626,665

(22) Filed: Jun. 19, 2017

(65) Prior Publication Data

US 2018/0032123 A1 Feb. 1, 2018

(30) Foreign Application Priority Data

Jul. 29, 2016 (JP) ................................. 2016-150574

(51) Int. Cl.
*G06F 1/329* (2019.01)
*G06F 1/3287* (2019.01)
*G06F 1/3209* (2019.01)

(52) U.S. Cl.
CPC .......... *G06F 1/3287* (2013.01); *G06F 1/3209* (2013.01); *G06F 1/329* (2013.01); *Y02D 10/171* (2018.01); *Y02D 10/24* (2018.01)

(58) Field of Classification Search
CPC ..... G06F 1/3287; G06F 1/3275; G06F 1/3296
See application file for complete search history.

(56) References Cited

U.S. PATENT DOCUMENTS

| 2012/0069394 A1* | 3/2012 | Ono ........................ G06F 3/121 |
| | | 358/1.15 |
| 2013/0145187 A1* | 6/2013 | Andreoli ............... G06F 3/1221 |
| | | 713/320 |

FOREIGN PATENT DOCUMENTS

JP 2001-290568 10/2001

* cited by examiner

*Primary Examiner* — Austin Hicks
(74) *Attorney, Agent, or Firm* — Staas & Halsey LLP

(57) ABSTRACT

A power source control executed by a processor includes setting a plurality of period candidates indicating candidates of a predetermined period; calculating, for each of a plurality of nodes, an average interval of idle periods in which a procedure is not executed for each of the plurality of period candidates, based on operation record information indicating history of procedures; calculating an amount of reduction of power consumption with respect to each of the plurality of period candidates based on the calculated average interval and an amount of power consumption in the idle period; selecting a period that is allocated to each of the plurality of nodes from among the plurality of period candidates based on the calculated amount of reduction; and executing, for each of the plurality of nodes, control to set the power source to an off state when the idle period becomes the selected period or more.

14 Claims, 11 Drawing Sheets

FIG. 2

| JOB NAME | NODE | DATE | SCHEDULED START TIME | SCHEDULED END TIME | COMMAND |
|---|---|---|---|---|---|
| jobA | nodeA | 2016/6/1 | 10:00 | 10:30 | /xxx/yyy.sh |
| jobB | nodeB | 2016/6/1 | 11:00 | 12:00 | /xxx/zzz.sh |
| ... | ... | ... | ... | ... | ... |

| JOB NAME | NODE | DATE | SCHEDULED START TIME | SCHEDULED END TIME | ... |
|---|---|---|---|---|---|
| jobA | nodeA | 2016/6/1 | 10:00:00 | 10:29:58 | ... |
| jobB | nodeB | 2016/6/1 | 11:00:00 | 12:00:06 | ... |
| ... | ... | ... | ... | ... | ... |

FIG. 5

| NODE | POWER CONSUMPTION [W] |
|---|---|
| nodeA | 100 |
| nodeB | 100 |
| ... | ... |

POWER SOURCE CONTROL METHOD, POWER SOURCE CONTROL APPARATUS, AND STORAGE MEDIUM

CROSS-REFERENCE TO RELATED APPLICATION

This application is based upon and claims the benefit of priority of the prior Japanese Patent Application No. 2016-150574, filed on Jul. 29, 2016, the entire contents of which are incorporated herein by reference.

FIELD

The embodiments discussed herein are related to a power source control method, a power source control apparatus, and a storage medium.

BACKGROUND

In the related art a technique is known for storing history information of a power on state and a power off state of an information processing device so that the power on state and the power off state of the information processing device are not repeated in a comparatively short period of time. According to such a technique, when a process is performed in which the power source of the information processing device is set in the off state based on stored history information, the process is held for a certain period of time. For example, Japanese Laid-open Patent Publication No. 2001-290568 is disclosed as the related art.

It is considered that, in a case where the information processing device is in an idle state for a certain period of time or more, the power source is set to the off state in order to reduce an amount of power consumption of the information processing device. In the present specification, for example, the information processing device being in the idle state means, for example, that the information processing device is being activated, but a job, that is a unit of execution of a predetermined process, is in a non-executed state, and thus the power source may be set to the off state. Hereinafter the above-mentioned certain period of time, that is, a reference period in which the power source is set to the off state when the information processing device is in the idle state for this period of time or more, is referred to as a "reference idle period".

It is considered that the power source is not set to the off state until a certain period of time elapses from a time when the power source is set to the power on state last time, even if the information processing device is in the idle state so that the power on and the power off of the information processing device are not repeated in a comparatively short period of time. Hereinafter the above-mentioned certain period of time, that is, a period that is a shortest value of the period during which the power source of the information processing device is not set to the off state from a time when the power source is set to the on state even if the information processing device is in the idle state, is referred to as a "shortest activated period".

In this case, a period in which the power source of the information processing device is set to the off state according to a set value of the reference idle period changes depending on scheduling circumstances of the job. That is, in this case, a reduced amount of power consumption of the information processing device changes according to the set value of the reference idle period depending on the scheduling circumstances of the job. Accordingly, in a case where the reference idle period is set to a fixed value, there may be a case in which the amount of power consumption of the information processing device may not be more reduced than a case in which the reference idle period is set to another value depending on the scheduling circumstances of the job. In view of the above, it is desirable that the amount of power consumption of the information processing device can be reduced.

SUMMARY

According to an aspect of the invention, a power source control executed by a processor included in a power source control apparatus, the power source control method includes setting a plurality of period candidates indicating candidates of a predetermined period used for setting a power source to an off state when a procedure is not executed in the predetermined period; calculating, for each of a plurality of nodes, an average interval of idle periods having a length of the predetermined period or more in which the procedure is not executed for each of the plurality of period candidates, based on operation record information indicating history of procedures executed in the plurality of nodes; calculating an amount of reduction of power consumption with respect to each of the plurality of period candidates based on the calculated average interval and an amount of power consumption in the idle period; selecting a period that is allocated to each of the plurality of nodes from among the plurality of period candidates based on the calculated amount of reduction; and executing, for each of the plurality of nodes, control to set the power source to an off state when the idle period becomes the selected period or more.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of scheduling information;

FIG. 3 is a diagram illustrating an example of operation record information;

FIG. 5 is a diagram illustrating an example of standby power information;

DESCRIPTION OF EMBODIMENTS

Examples of embodiments that relate to disclosed techniques will be described below in detail with reference to the drawings.

First, prior to describing the embodiments in detail, problems in a case where a reference idle period is a fixed value will be described with reference to FIG. 11. As described above, the "reference idle period" means a reference period in which a power source is set to an off state in a case of being in an idle state for this period or more. As described above, hereinafter a period that is a shortest value of the period in which the power source of the information processing device is not set to the off state from a time when the power source is set to the on state even if the information processing device is in the idle state, is referred to as a "shortest activated period".

Figure 11:
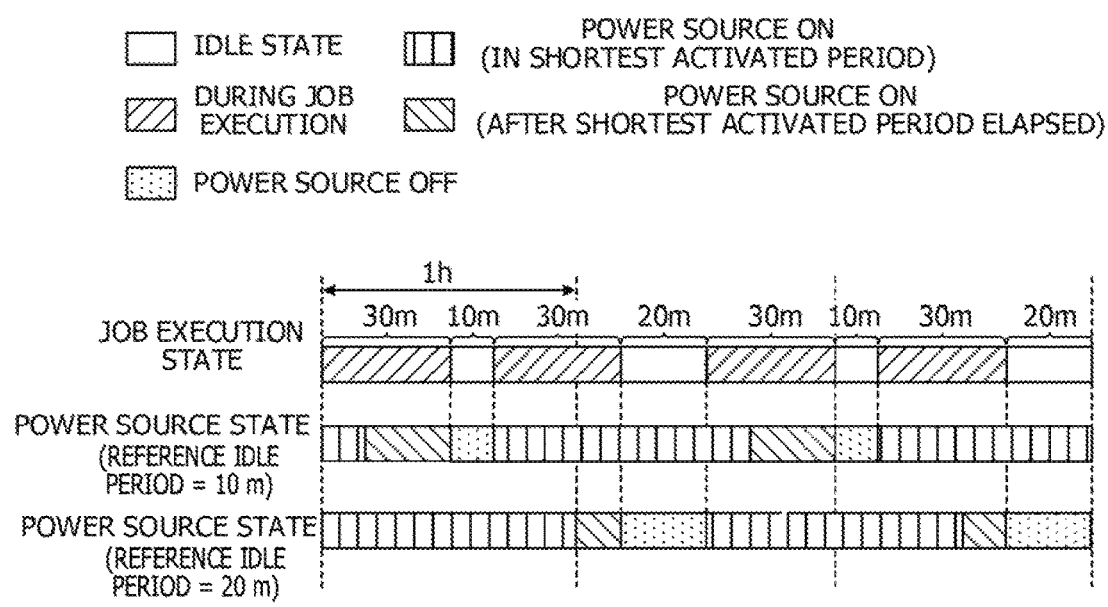
FIG. 11 is a diagram for describing a difference of power source states of an information processing device by the reference idle periods being different.

As indicated in an upper level in FIG. 11, for example, an explanation is made as to a case where 30 minutes of a job execution time, 10 minutes of the idle state period and 20 minutes of the idle state period are repeated in the information processing device. Here, for example, a case where the shortest activated period is 60 minutes is described. The middle level in FIG. 11 indicates a power source state of the information processing device in a case where the reference idle period is 10 minutes. The lower level in FIG. 11 indicates a power source state of the information processing device in a case where the reference idle period is 20 minutes.

In the example indicated in FIG. 11, the period in which the power source of the information processing device is in the off state becomes longer in the case where the reference idle period is 20 minutes than in the case where the reference idle period is 10 minutes. Therefore, the amount of power reduction of the information processing device becomes greater.

In this manner, in a case where the reference idle period is set to a fixed value, there may be a case in which the amount of power consumption of the information processing device is not more reduced than a case in which the reference idle period is set to another value depending on the scheduling circumstances of the job.

First Embodiment

Figure 1:
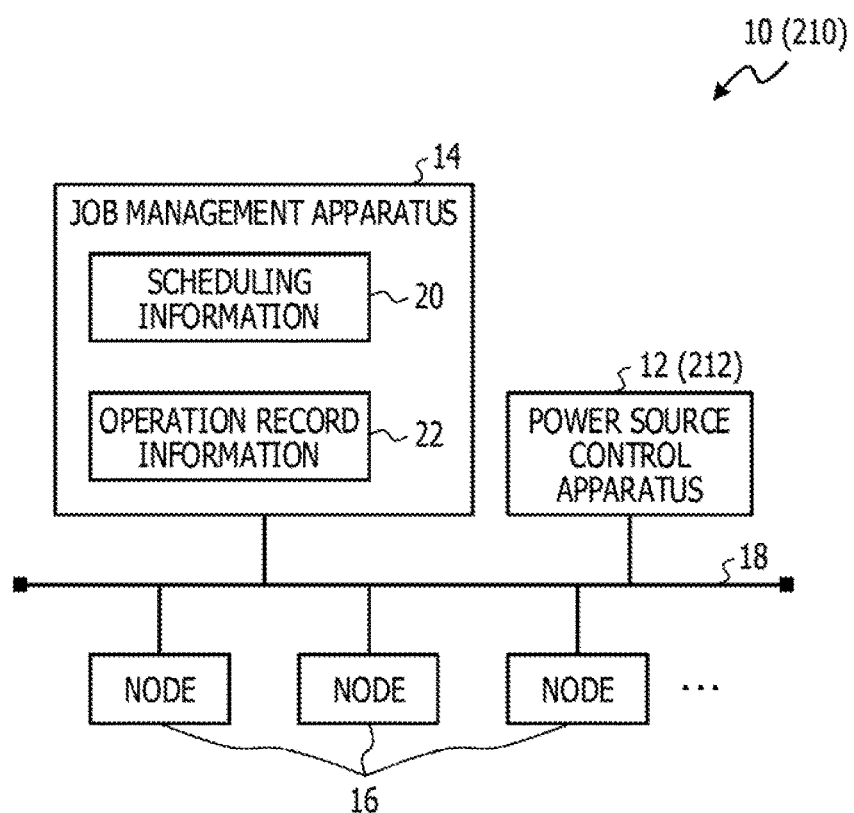
FIG. 1 is a block diagram illustrating an outline configuration of a power source control system according to each embodiment.

First, a configuration of a power source control system 10 according to the present embodiment will be described with reference to FIG. 1. As indicated in FIG. 1, the power source control system 10 includes a power source control apparatus 12, a job management apparatus 14, and a plurality of nodes 16. Then, the power source control apparatus 12, the job management apparatus 14, and each node 16 are connected to be able to communicate with each other through a network 18. In the present embodiment, for example, each node 16 is a node that constitutes a comparatively large scale computer system. Parallel processes are executed using each node 16.

The power source control apparatus 12 performs control to set the power source in each node 16 to the off state and to the on state. The power source control apparatus 12 will be described later in detail.

For example, the job management apparatus 14 performs control to cause each node 16 to execute the job by a job scheduler program or the like. Scheduling information 20 which relates to job scheduling and operation record information 22 which relates to past operation recording of a job are stored in a predetermined storage region of the job management apparatus 14.

FIG. 2 indicates an example of the scheduling information 20. As indicated in FIG. 2, a job name, a node, a date, a scheduled start time, a scheduled end time, a command, and the like are stored as the scheduling information 20.

A name of the job is stored in the job name. A name of the node 16 in which the job is executed is stored in the node. A date at which the job is executed is stored in the date. A scheduled time at which the execution of the job starts is stored in the scheduled start time. A scheduled time at which the execution of the job ends is stored in the scheduled end time. A command that is executed by the job is stored in the command.

FIG. 3 illustrates an example of the operation record information 22. As indicated in FIG. 3, the job name, the node, the date, a start time, an end time, and the like are stored as the operation record information 22.

The name of the job is stored in the job name. The name of the node 16 in which the job is executed is stored in the node. The date at which the job is executed is stored in the date. The time at which the execution of the job starts is stored in the start time. The time at which the execution of the job ends is stored in the end time.

Figure 4:
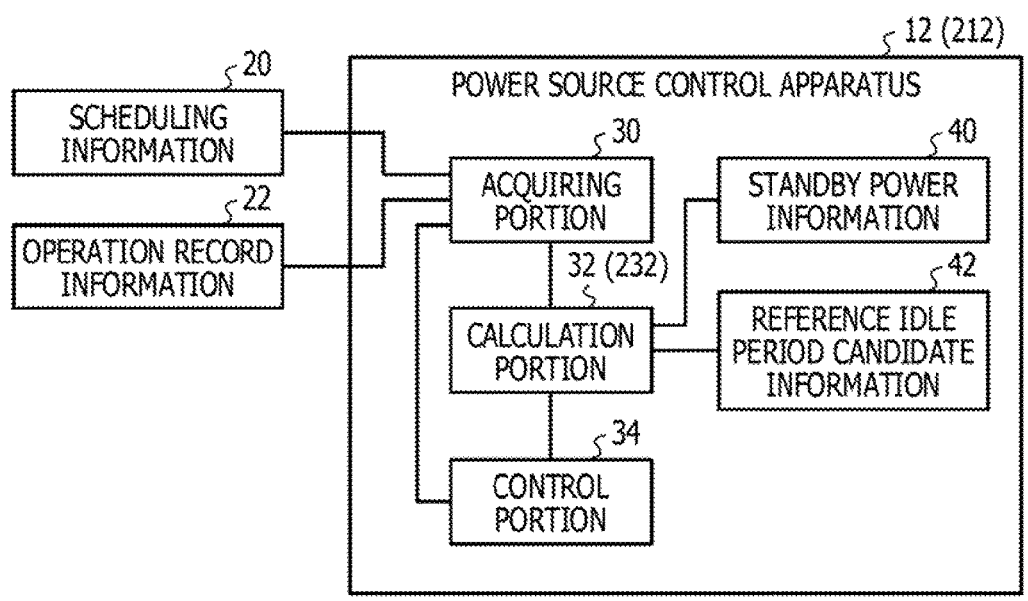
FIG. 4 is a functional block diagram of a power source control apparatus according to each embodiment.

Next, a functional configuration of the power source control apparatus 12 according to the present embodiment will be described with reference to FIG. 4. As indicated in FIG. 4, the power source control apparatus 12 includes an acquiring portion 30, a calculation portion 32, and a control portion 34. Standby power information 40 and reference idle period candidate information 42 are stored in a predetermined storage region of the power source control apparatus 12.

FIG. 5 indicates an example of the standby power information 40. As indicated in FIG. 5, power consumption [W] in the idle state is stored in each node 16 in the standby power information 40. As the power consumption, for example, power consumption measured in advance in a state in which the node 16 is in the idle state using a power governor or the like that is provided by Intel (registered trademark) may be stored.

A plurality of different reference idle period candidates are stored in the reference idle period candidate information 42. In the present embodiment, for example, a plurality of reference idle periods $t_i$[h] with different arrangement formations such as $t_i$ (i=integers 1 to m)=[0.1, 0.3, . . . ] are stored in the reference idle period candidate information 42.

The acquiring portion 30 acquires each of the scheduling information 20 and the operation record information 22 from the job management apparatus 14 via the network 18.

The calculation portion 32 calculates a reference idle period t for each node 16 based on the operation record information 22, the standby power information 40, and the reference idle period candidate information 42 that are acquired by the acquiring portion 30.

First, in the present embodiment, the calculation portion 32 calculates an average interval $t_{in}$ for each node 16 by analyzing the operation record information 22, with respect to each reference idle period $t_i$ that is stored in the reference idle period candidate information 42. The average interval $t_{in}$ represents an average of intervals in which the idle state of the node 16 continues during the reference idle period $t_i$.

Specifically, the calculation portion 32 specifies, from the operation record information 22, a period in which the job is executed and a period in which the job is not executed, that is, a period in which the node 16 is in the idle state. Then, the calculation portion 32 calculates, as the average interval $t_{in}$, an average value of the intervals of periods that are equal to or more than adjacent reference idle periods $t_i$ out of periods in which the specified node 16 is in the idle state for each reference idle period L. For example, when $t_i$=0.1[h], in a case where it is calculated that $t_{in}$=0.5[h], the average value of the intervals between the periods in which the idle state of the node 16 continues for 0.1 hours or more is 0.5 hours.

In addition, the calculation portion 32 calculates an amount of power reduction e[Wh] in a predetermined period L according to the following Formula (1). In Formula (1), I is a minimum value of (shortest activated period T+$t_i$) or more out of multiples of ($t_i$+$t_{in}$). $P_{idle}$ is power consumption in the idle state of the node 16. The period L may be set according to an operation policy and the like. The shortest activated period T may be set according to a hardware configuration and the like of the node 16.

$$e = \frac{L}{l} \times t_i \times p_{idle} \quad (1)$$

Then, the calculation portion 32 sets, as the reference idle period t, the reference idle period $t_i$ in which the calculated amount of power reduction e is maximized (that is, the amount of power consumption in the period L is minimized). The calculation portion 32 may set, as the reference idle period t, any reference idle period $t_i$ in which the amount of power reduction e is a predetermined value or more other than the reference idle period $t_i$ in which the amount of power reduction e is maximized.

Here, for example, a case is described in which it is calculated that $t_i$ (i=1, 2)=[0.1[h], 0.3[h]], $t_{1n}$=0.5[h], and $t_{2n}$=0.8[h]. Furthermore, for example, a case is described in which T=1[h], L=24[h], and $P_{idle}$=100[W].

Figure 6:
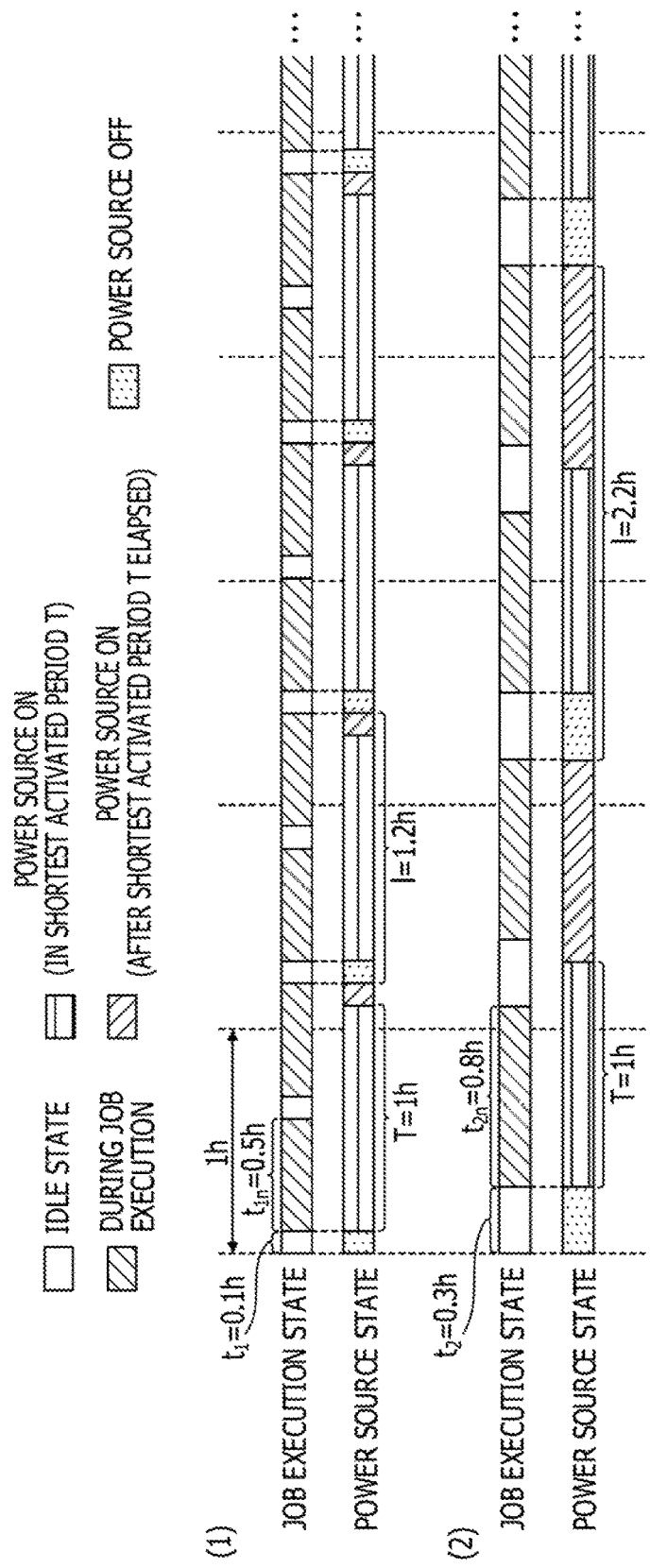
FIG. 6 is a diagram for describing an example of a calculation process of a reference idle period.

In this case, ($t_1$+$t_{1n}$) is 0.6[h] and (T+$t_1$) is 1.1[h]. Accordingly, I corresponding to $t_1$ is 1.2[h]. This means that, as indicated in FIG. 6(1) for example, it is possible to set the power source of the node 16 to the off state during 0.1 hour in every 1.2 hours in a case where the interval between an idle state of 0.1 hour and an idle state of a subsequent 0.1 hour is 0.5 hours in the node 16. FIGS. 6(1) and 6(2) indicate job execution states and power source states of the node 16 that are schematically represented by $t_i$, $t_{in}$ that are calculated by analyzing the operation record information 22. The upper level in FIG. 6(1) indicates the job execution state that represents whether the job is being executed or in the idle state (that is, the job is non-executed). The lower level in FIG. 6(1) indicates the power source state that represents whether the power source of the node 16 is in the off state, in the on state in the shortest activated period T, or in the on state after the shortest activated period T has elapsed.

Then, e corresponding to $t_1$ is (24/1.2)×0.1×100=200 [Wh] according to Formula (1).

Meanwhile, ($t_2$+$t_{2n}$) is 1.1[h] and (T+$t_2$) is 1.3[h]. Accordingly, I corresponding to $t_2$ is 2.2[h]. This means that, as indicated in FIG. 6(2) for example, it is possible to set the power source of the node 16 to the off state during 0.3 hours in every 2.2 hours in a case where the interval between an idle state of 0.8 hour and an idle state of a subsequent 0.8 hour is 0.5 hours in the node 16. The upper level and the lower level in FIG. 6(2) indicate the job execution state and the power source state in the same manner as in FIG. 6(1).

Then, e corresponding to $t_2$ is (24/2.2)×0.3×100=327 (Wh) according to Formula (1).

Accordingly, in this case, the calculation portion 32 calculates the reference idle period t as 0.3[h]. The calculation portion 32 calculates and updates, for each node 16, the reference idle period t at regular timing such as once a week. Thereby, it is possible to update the reference idle period t to an appropriate value even in a case where there is a change in the scheduling circumstance of the job, the operation policy, and the like.

The control portion 34 performs control to set the power source of the node 16 to the off state in a case where a period in which the node 16 is in the idle state is equal to or more than the reference idle period t calculated by the calculation portion 32 and the elapsed period from a time when the power source is set to the on state last time exceed the shortest activated period T. For example, the control portion 34 specifies, based on the scheduling information 20, the timing at which the period in which the node 16 is in the idle state is equal to or more than the reference idle period t and the elapsed period from the time when the power source is set to the on state last time exceed the shortest activated period T. Then, the control portion 34 reserves execution of a process for setting the node 16 to the power off state so that the process is executed at the specified timing. Furthermore, the control portion 34 reserves execution of a process for setting the power source of the node 16 to the on state so that the node 16 is activated and the job can be executed at timing at which the job is executed first after the specified timing.

For example, the control portion 34 may perform, based on the operation record information 22 and the scheduling information 20, the process as indicated below in a case where the node 16 is currently in the idle state and the elapsed period from the time when the power source is set to the on state last time exceeds the shortest activated period T. That is, in the above-mentioned case and in a case where the period up to the scheduled start time of the job that is subsequently executed is the reference idle period t or more, the control portion 34 may perform control to set the power source of the node 16 to the off state. Furthermore, in this case, the control portion 34 reserves execution of the process for setting the power source of the node 16 to the on state so that the node 16 is activated and the job can be executed at timing at which the job is executed next.

Figure 7:
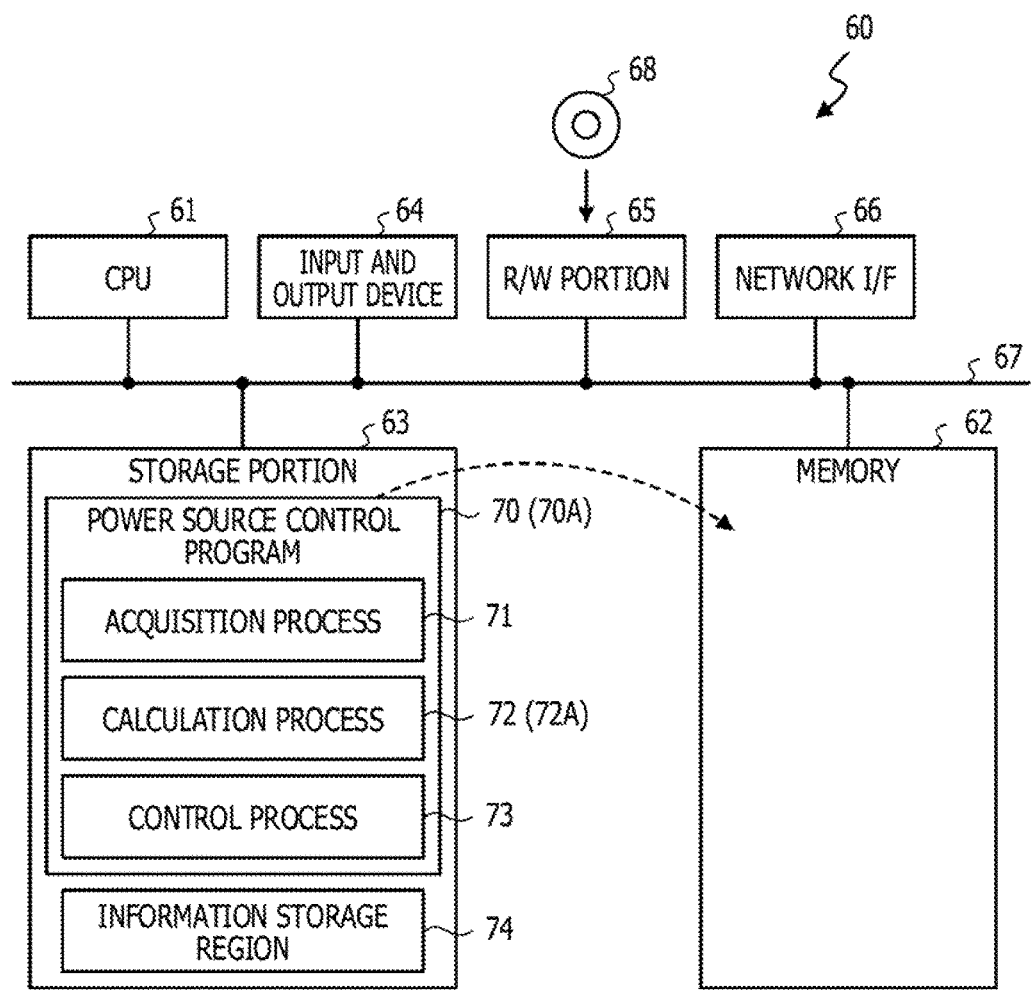
FIG. 7 is a block diagram illustrating an outline configuration of a computer that functions as the power source control apparatus according to each embodiment.

For example, the power source control apparatus 12 may be realized by a computer 60 indicated in FIG. 7. The computer 60 includes a central processing unit (CPU) 61, a memory 62 as a temporary storage region, and a nonvolatile storage portion 63. Furthermore, the computer 60 includes an input and output device 64 such as a display device, an input device, and the like. Furthermore, the computer 60 includes a read/write (R/W) portion 65 that controls reading and writing of data from and to the recording medium 68 and a network I/F 66 that is connected to the network. The CPU 61, the memory 62, the storage portion 63, the input and output device 64, the R/W portion 65, and the network I/F 66 are connected to each other via a bus 67.

The storage portion 63 may be realized by a hard disk drive (HDD), a solid state device (SSD), a flash memory, and the like. A power source control program 70 for causing the computer 60 to function as the power source control apparatus 12 is stored in the storage portion 63 as the storage medium. The power source control program 70 has an acquisition process 71, a calculation process 72, and a control process 73. The storage portion 63 has an information storage region 74 in which the standby power information 40 and the reference idle period candidate information 42 are stored.

The CPU 61 reads out the power source control program 70 from the storage portion 63 and develops it in the memory 62, and executes the processes the power source control program 70 has. The CPU 61 operates as the acquiring portion 30 that is indicated in FIG. 4 by executing the acquisition process 71. The CPU 61 operates as the calculation portion 32 that is indicated in FIG. 4 by executing the calculation process 72. The CPU 61 operates as the control portion 34 that is indicated in FIG. 4 by executing the control process 73. Thereby, the computer 60 that executes the power source control program 70 functions as the power source control apparatus 12.

The function realized by the power source control program 70 may also be realized by, for example, a semiconductor integrated circuit, and more specifically an application specific integrated circuit (ASIC) and the like.

Figure 8:
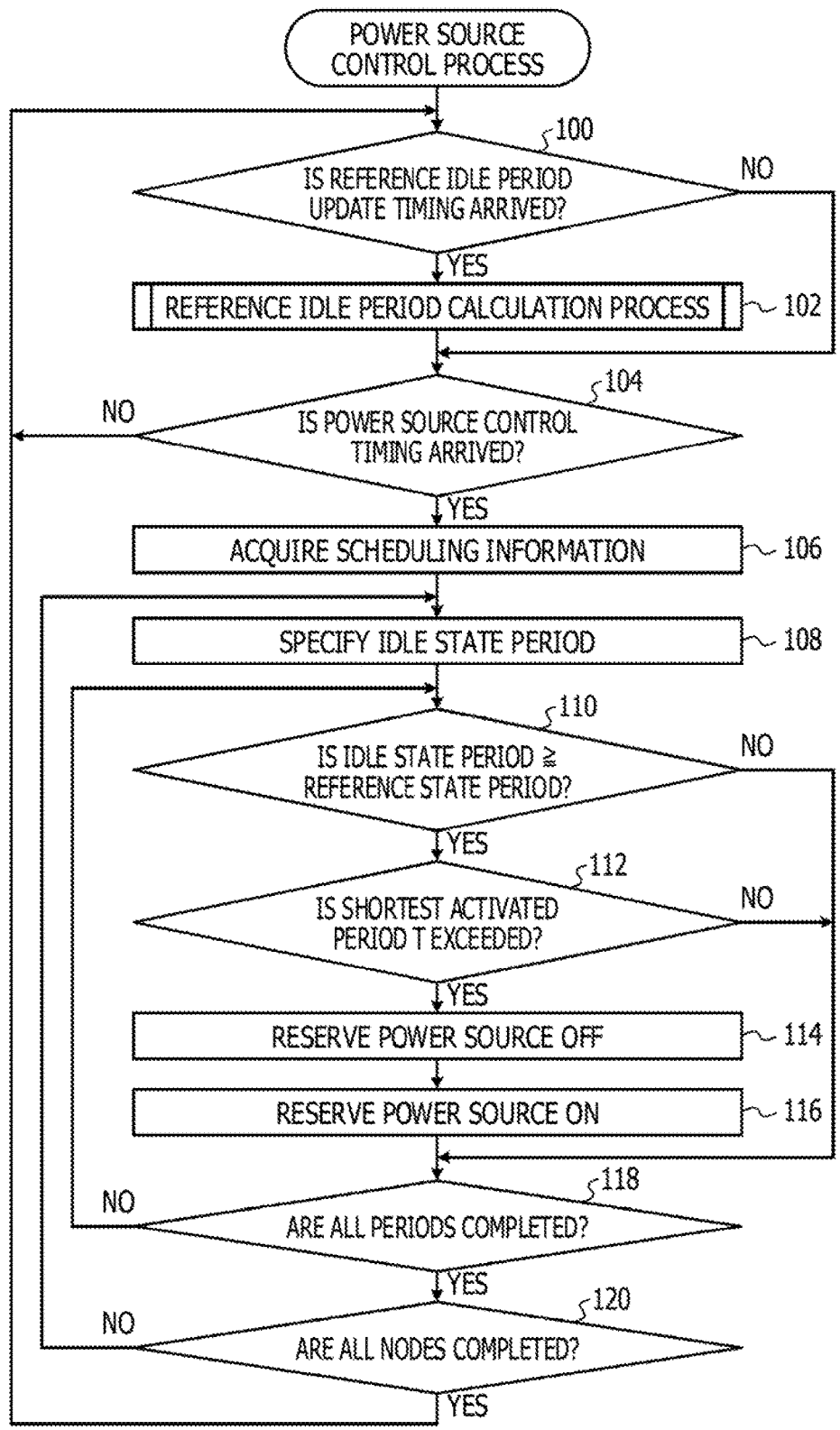
FIG. 8 is a flow chart illustrating an example of a power source control process according to each embodiment.

Next, the actions of the power source control apparatus 12 according to the present embodiment will be described. A power source control process indicated in FIG. 8 is executed by executing the power source control program 70 by the power source control apparatus 12. For example, the power source control process indicated in FIG. 8 is executed by the CPU 61 at timing or like at which the power source of the power source control apparatus 12 is set to the on state.

In step 100 of the power source control process that is indicated in FIG. 8, the control portion 34 determines whether or not the update timing of the reference idle period t is arrived at. The process transitions to step 104 in a case where the determination is a negative determination. The process transitions to step 102 in a case where the determination is a positive determination. In the present embodiment, the control portion 34 determines that the update timing of the reference idle period t is arrived at regular timing such as each time one week passes, for example.

Figure 9:
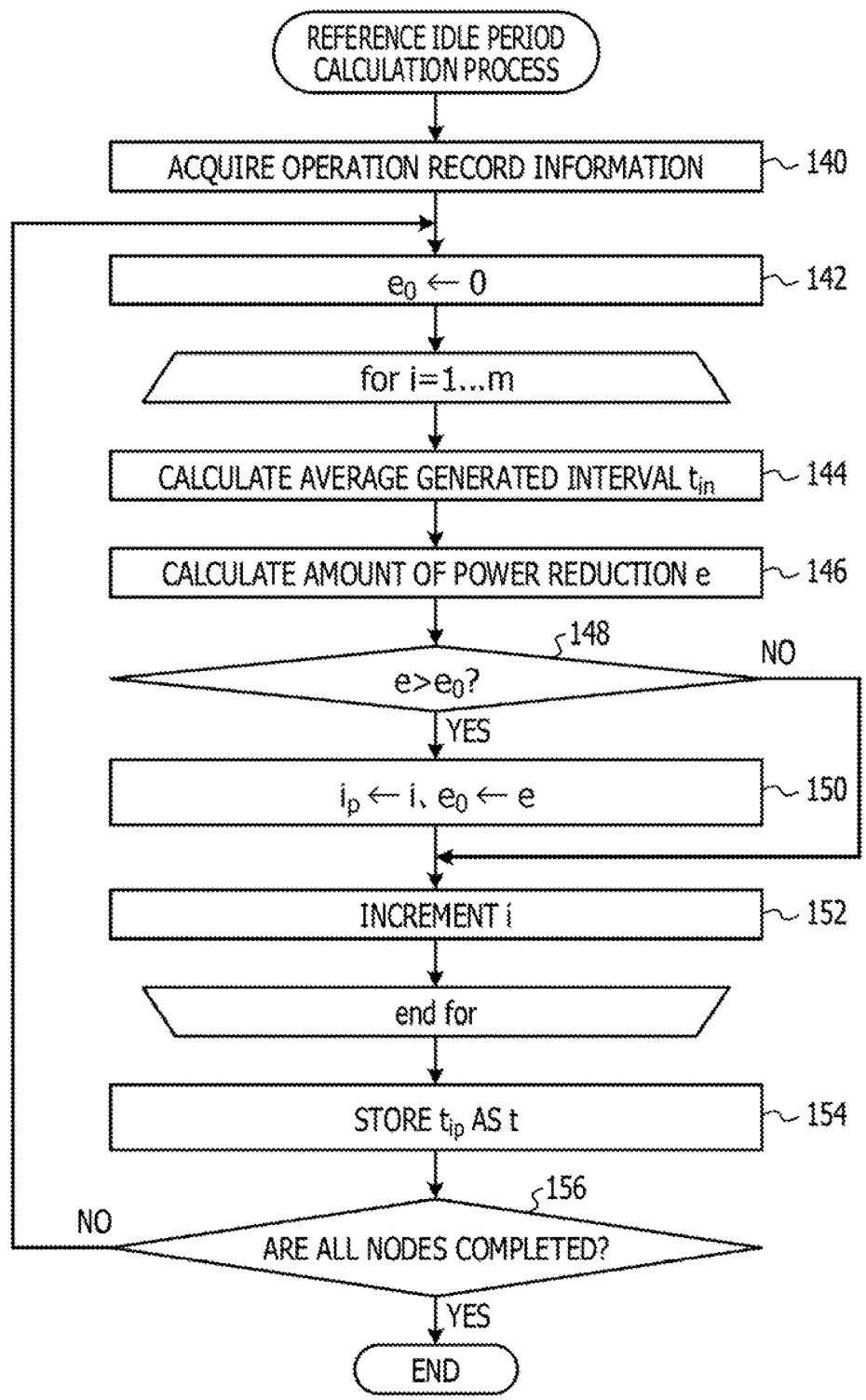
FIG. 9 is a flow chart illustrating an example of a reference idle period calculation process according to a first embodiment.

In the subsequent step 102, the process transitions to step 104 after a reference idle period calculation process that is indicated in FIG. 9 is executed.

In step 140 of the reference idle period calculation process that is indicated in FIG. 9, the acquiring portion 30 acquires the operation record information 22 from the job management apparatus 14. The following processes from step 142 to step 154 are executed by setting, as process targets, any node 16 out of all nodes 16. When the processes from step 142 to step 154 are repeatedly executed, the nodes 16 that have not been set as process targets up to that point are set as the process targets.

In the subsequent step 142, the calculation portion 32 assigns 0 to a variable $e_0$ for holding the maximum value of the amount of power reduction e. The following processes from step 144 to step 152 are repeatedly executed with an initial value of a variable i is 1, and until the variable i exceeds m, that is, repeatedly executed for the same number of times as the number of reference idle periods $t_i$ that is stored in the reference idle period candidate information 42.

In step 144, as described above, the calculation portion 32 calculates the average interval $t_{in}$ by analyzing the operation record information 22 that is acquired in step 140. In a subsequent step 146, as described above, the calculation portion 32 calculates the amount of power reduction e according to Formula (1). In the subsequent step 148, the calculation portion 32 determines whether or not the amount of power reduction e that is calculated in step 146 is larger than the variable $e_0$. The process transitions to step 152 in a case where the determination is a negative determination. The process transitions to step 150 in a case where the determination is a positive determination.

In step 150, the calculation portion 32 assigns the value of the variable i to a variable $i_p$ for holding the variable i when the value of the amount of power reduction e that is calculated in step 146 is maximized. The calculation portion 32 assigns the amount of power reduction e that is calculated in step 146 to the variable $e_0$. In the subsequent step 152, the calculation portion 32 increments the variable i.

In step 154, the calculation portion 32 sets a reference idle period $t_{ip}$ that is a number value (value of the variable $i_p$) of the reference idle period candidate information 42 as the reference idle period t and stores it in the predetermined storage region of the storage portion 63 in association with the node 16 that is the process target. In the subsequent step 156, the calculation portion 32 determines whether or not the processes from step 142 to step 154 are executed for all nodes 16. The process returns to step 142 in a case where the determination is a negative determination. The present reference idle period calculation process ends in a case where the determination is a positive determination. When the present reference idle period calculation process ends, the process transitions to step 104 of the power source control process.

In step 104 that is indicated in FIG. 8, the control portion 34 determines whether or not the timing at which the power source state of the node 16 is controlled is arrived at. The process returns to step 100 in a case where the determination is a negative determination. The process transitions to step 106 in a case where the determination is a positive determination. In the present embodiment, the control portion 34 determines at regular timing such as each time three weeks passes, for example that the timing for controlling the power source state of the node 16 is arrived at.

In step 106, the acquiring portion 30 acquires the scheduling information 20 from the job management apparatus 14. The following processes from step 108 to step 118 are executed by setting, as process targets, any node 16 out of all nodes 16. When the processes from step 108 to step 118 are repeatedly executed, the nodes 16 that have not been set as process targets up to that point are set as the process targets.

In the subsequent step 108, the control portion 34 performs the processes indicated below based on the scheduling information 20 that is acquired in step 106. That is, the control portion 34 specifies a period (hereinafter referred to as "idle state period") in which the node 16 is in the idle state at the current time or after based on the scheduling information 20. The following processes from step 110 to step 116 are executed by setting, as process targets, any idle state periods out of all idle state periods that are specified by step 108. When the processes from step 110 to step 116 are repeatedly executed, the idle state periods that have not been set as process targets up to that point are set as the process targets.

In step 110, the control portion 34 determines whether or not the idle state period is the reference idle period t or more that is calculated in step 102. The process transitions to step 118 in a case where the determination is a negative determination. The process transitions to step 112 in a case where the determination is a positive determination.

In step 112, the control portion 34 determines whether or not the elapsed period from a time when the power source of the node 16 is set just before to the on state until the idle state period exceeds the shortest activated period T. The process transitions to step 118 in a case where the determination is a negative determination. The process transitions to step 114 in a case where the determination is a positive determination.

In step 114, the control portion 34 reserves execution of a process for setting the power source of the initial node 16 to off state, so that the process is executed at the beginning of the idle state period.

In the subsequent step 116, the control portion 34 performs the following processes so that the node 16 is activated and the job can be executed at the timing at which the job is first executed after the timing at which the power source of the node 16 is set to the off state by the process in step 114. That is, the control portion 34 reserves execution of the process for setting the power source of the node 16 to the on state so that the node 16 is activated and the job can be executed at the timing at which the job is executed first.

In the subsequent step 118, the control portion 34 determines whether or not the processes from step 110 to step 116 are completed for all idle state periods that are specified in step 108. The process returns to step 110 in a case where the determination is a negative determination. The process transitions to step 120 in a case where the determination is a positive determination.

In the subsequent step 120, the control portion 34 determines whether or not the processes from step 108 to step 118 are completed for all nodes 16. The process returns to step 108 in a case where the determination is a negative determination. The process returns to step 100 in a case where the determination is a positive determination.

As described above, according to the present embodiment, the amount of power reduction e is calculated for each of a plurality of different reference idle times $t_i$ based on the operation record information 22. Then, control for setting the power source of the node 16 to the off state is performed in a case where the idle state of the node 16 is equal to or more than the reference idle period t at which the amount of power reduction e is maximized. Accordingly, it is possible to reduce the amount of power consumption of the node 16.

Second Embodiment

Next, a second embodiment will be described. In a power source control system according to the present embodiment, the same parts as in the power source control system 10 according to the first embodiment use the same reference numerals and detailed description is omitted.

As indicated in FIG. 1, a power source control system 210 according to the present embodiment includes a power source control apparatus 212, the job management apparatus 14, and the plurality of nodes 16.

As indicated in FIG. 4, the power source control apparatus 212 according to the present embodiment includes the acquiring portion 30, a calculation portion 232, and the control portion 34. Standby power information 40 and reference idle period candidate information 42 are stored in the predetermined storage region of the power source control apparatus 212.

The calculation portion 232 according to the present embodiment calculates the average interval $t_{in}$ for each of the nodes 16 with respect to each reference idle period $t_i$ that is stored in the reference idle period candidate information 42 in the same manner as the calculation portion 32 according to the first embodiment.

The calculation portion 232 calculates a function $f(t_i)$ with the idle period $t_i$ as an input and the average interval $t_{in}$ as an output by performing an interpolation process such as B spline interpolation with each reference idle period $t_i$ and the corresponding average interval $t_{in}$ as sample points.

As described above, I in Formula (1) is a minimum value which is (shortest activated period $T+t_i$) or more out of multiples of $(t_r+t_{in})$, that is, $(t_r+f(t_i))$. Therefore, in the present embodiment, the calculation portion 232 calculates a reference idle period $t_{ib}$ which becomes minimum when a function h $(t_{ib})$ is 0 or more that is indicated by the subsequent Formula (2).

$$h(t_{ib})=\alpha\times(t_{ib}+f(t_{ib}))-(T+t_{ib}) \tag{2}$$

In the present embodiment, the calculation portion 232 increases a one by one at 1, 2, 3, . . . , r, and calculates the reference idle period $t_{ib}$ which becomes minimum when the function h $(t_{ib})$ is 0 or more. For example, it is possible to calculate the reference idle period $t_{ib}$ using an increase and decrease table and the like. The calculation portion 232 calculates the amount of power reduction e for each of the reference idle periods $t_{ib}$ according to Formula (1). Then, the calculation portion 32 sets, as the reference idle period t, the reference idle period $t_{ib}$ in which the calculated amount of power reduction e is maximized. An upper limit of $\alpha$ may be appropriately determined according to requested calculation precision and the like.

The power source control apparatus 12 may be realized by a computer 60 that is indicated in FIG. 7, for example. A power source control program 70A for causing the computer 60 to function as the power source control apparatus 212 is stored in the storage portion 63 of the computer 60. The power source control program 70A has the acquisition process 71, a calculation process 72A, and the control process 73.

The CPU 61 reads out the power source control program 70A from the storage portion 63 and develops in the memory 62, and executes a process that the power source control program 70A has. The CPU 61 operates as the acquiring portion 30 that is indicated in FIG. 4 by executing the acquisition process 71. The CPU 61 operates as the calculation portion 232 that is indicated in FIG. 4 by executing the calculation process 72A. The CPU 61 operates as the control portion 34 that is indicated in FIG. 4 by executing the control process 73. Thereby, the computer 60 that executes the power source control program 70A functions as the power source control apparatus 212.

It is also possible to realize the function realized by the power source control program 70A by, for example, a semiconductor integrated circuit, and more specifically an ASIC and the like.

Next, the actions of the power source control apparatus 212 according to the present embodiment will be described. Here, the reference idle period calculation process is described with reference to FIG. 10 since other than the reference idle period calculation process that is executed in step 102 of the power source control process (refer to FIG. 8), there is no difference from the first embodiment.

Figure 10:
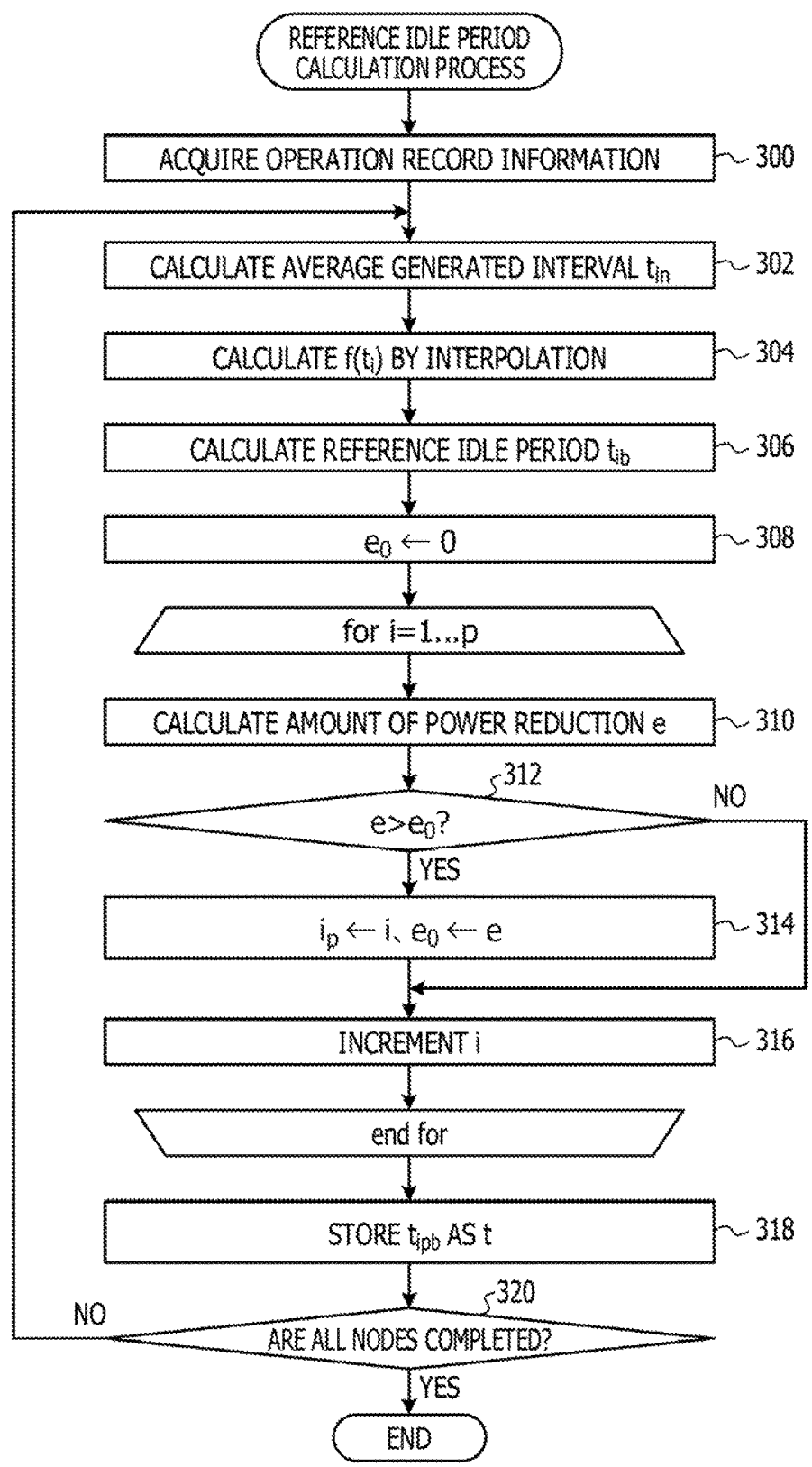
FIG. 10 is a flow chart illustrating an example of a reference idle period calculation process according to a second embodiment.

In step 300 of the reference idle period calculation process that is indicated in FIG. 10, the acquiring portion 30 acquires the operation record information 22 from the job management apparatus 14. The following processes from step 302 to step 318 are executed by setting, as process targets, any node 16 out of all nodes 16. When the processes from step 302 to step 318 are repeatedly executed, the nodes 16 that have not been set as process targets up to that point are set as the process targets.

In the subsequent step 302, the calculation portion 232 calculates the average interval $t_{in}$ for each reference idle period $t_i$ that is stored in the reference idle period candidate information 42 by analyzing the operation record information 22 that is acquired in step 300.

In the subsequent step 304, the calculation portion 232 calculates a function $f(t_i)$ with the reference idle period $t_i$ as an input and the average interval $t_{in}$ as an output by performing an interpolation process such as B spline interpolation with each reference idle period $t_i$ and the corresponding average interval $t_{in}$ as sample points.

In the subsequent step 306, as described above, the calculation portion 232 calculates the reference idle period $t_{ib}$ which becomes minimum when the function $h(t_{ib})$ is 0 or more according to Formula (2). Here, in order to avoid confusion, it is presumed that p number of reference idle periods $t_{ib}$ are calculated in the present step 306.

In the subsequent step 308, the calculation portion 232 assigns 0 to a variable $e_0$ for holding the maximum value of the amount of power reduction e. The following processes from step 310 to step 316 are repeatedly executed until the variable i of which initial value being set to 1 exceeds the p number of reference idle periods $t_{ib}$ that are calculated in step 306.

In step 310, as described above, the calculation portion 232 calculates the amount of power reduction e according to Formula (1). In the subsequent step 312, the calculation portion 232 determines whether or not the amount of power reduction e that is calculated in step 310 is larger than the variable $e_0$. The process transitions to step 316 in a case where the determination is a negative determination. The process transitions to step 314 in a case where the determination is a positive determination.

In step 314, the calculation portion 232 assigns the value of the variable i to a variable $i_p$ for holding the variable i when the amount of power reduction e that is calculated in step 310 is maximized. The calculation portion 232 assigns the amount of power reduction e that is calculated in step 310 to the variable $e_0$. In the subsequent step 316, the calculation portion 232 increments the variable i.

In step 318, the calculation portion 232 sets, as the reference idle period t, a reference idle period $t_{ipb}$ that is a number value (value of the variable $i_p$) of the reference idle period $t_{ib}$ that is calculated in step 306 and stores in the predetermined storage region of the storage portion 63 in association with the node 16 that is the process target. In the subsequent step 320, the calculation portion 232 determines whether or not the following processes from step 302 to step 318 are executed for all nodes 16. The process returns to step 302 in a case where the determination is a negative determination. The present reference idle period calculation process ends in a case where the determination is a positive determination. When the present reference idle period calculation process ends, the process transitions to step 104 of the power source control process.

As described above, according to the present embodiment, the reference idle period t is calculated using the function $f(t_i)$ that is obtained by interpolating the average interval that is calculated for each of a plurality of reference idle periods. Accordingly, it is possible to calculate a more appropriate reference idle period t because a reference idle period other than the reference idle period $t_i$ that is stored in the reference idle period candidate information 42 can be a candidate of the reference idle period.

In the second embodiment, a case where B spline interpolation is applied is described as the interpolation process, but is not limited thereto. For example, as the interpolation process, another interpolation process such as interpolation by a Bezier curve may be applied.

In each embodiment, an aspect is described in which the power source control programs 70 and 70A are stored in advance (installed) in the storage portion 63, but is not limited thereto. It is also possible to provide the power source control programs 70 and 70A as being stored in a recording medium such as a CD-ROM, a DVD-ROM, a USB memory, or a memory card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power source control method executed by a processor included in a power source control apparatus, the power source control method comprising:
    setting a plurality of period candidates indicating candidates of a predetermined period used for setting a power source to an off state when a procedure is not executed in the predetermined period;
    calculating, for each of a plurality of nodes, an average interval of idle periods having a length of the predetermined period or more in which the procedure is not executed for each of the plurality of period candidates, based on operation record information indicating history of procedures executed in the plurality of nodes;
    calculating an amount of reduction of power consumption with respect to each of the plurality of period candidates based on the average interval, an amount of power consumption of each one of the plurality of nodes in an idle period during which a job is not executed by the node, and a shortest activated period that indicates a period that is a shortest value of the period during which the power source of the power source control apparatus is not set to the off state even if the power source control apparatus is not executing the job from a time when the power source is set to the on state, the shortest activated period being set to prevent frequent switching between the on state and the off state conducted by the node;
    selecting a period that is allocated to each of the plurality of nodes from among the plurality of period candidates based on the amount of reduction of power consumption; and
    executing, for each of the plurality of nodes, control to set the power source to an off state when the idle period becomes the selected period or more.

2. The power source control method according to claim 1, wherein the selecting includes selecting, for each of the plurality of nodes, a period in which the amount of reduction of power consumption becomes maximum from among the plurality of period candidates.

3. The power source control method according to claim 1, wherein the selecting includes:
    extracting, for each of the plurality of nodes, a period in which the amount of reduction of power consumption becomes a predetermined value or more from the plurality of period candidates; and
    selecting any of the extracted periods.

4. The power source control method according to claim 1, wherein the shortest activated period is per node.

5. The power source control method according to claim 4, wherein the calculating the amount of reduction includes:
calculating, for each of the plurality of period candidates, a minimum value that becomes a total value or more of the shortest activated period and a period candidate out of a multiple of a total value of the average interval of idle periods and the period candidate, the minimum value being per period candidate; and
calculating the amount of reduction of power consumption by multiplying a result, which is obtained by dividing the predetermined period by the minimum value, by the average interval of idle periods and the amount of power consumption in the idle period.

6. The power source control method according to claim 4, wherein calculating the amount of reduction of power consumption includes:
calculating a function with the period candidate as an input and the average interval as an output by interpolating the average interval of idle periods that is calculated for each of the plurality of period candidates;
subtracting a total amount of the shortest activated period and an input value from a predetermined multiple of a total of an input value and an output value of the calculated function;
calculating one or more periods in which a subtracted value that is obtained by a subtraction becomes minimum; and
calculating the amount of reduction of power consumption for each of the one or more periods.

7. The power source control method according to claim 6, wherein the selecting includes selecting a period in which the amount of reduction of power consumption becomes maximum from one or more periods in which a subtracted value that is obtained by a subtraction becomes minimum.

8. The power source control method according to claim 1, wherein the executing the power off control includes executing control to set the power source to an off state when an idle period during which the job is not executed by the node is the selected period or more and a shortest activated period is elapsed, the shortest activated period representing a present shortest elapsed time from a time when the power source of a node is set to an on state until the power source is permitted to be set to the off state.

9. The power source control method according to claim 1, wherein the operation record information is information in which classification of an executed procedure, classification of a node, a start time of the executed procedure, and an end time of the executed procedure are associated with each other for each of the plurality of period candidates.

10. A power source control apparatus comprising: a memory; and a processor coupled to the memory and configured to:
set a plurality of period candidates Indicating candidates of a predetermined period used for setting a power source to an off state when a procedure is not executed in the predetermined period;
calculate, for each of a plurality of nodes, an average interval of idle periods having a length of the predetermined period or more in which the procedure is not executed for each of the plurality of period candidates, based on operation record information indicating history of procedures executed in the plurality of nodes;
calculate, for each of the plurality of period candidates, an amount of reduction of power consumption based on the average interval of idle periods, an amount of power consumption each one of the plurality of nodes in an idle period during which a job is not executed by the node, and a shortest activated period that Indicates a period that is a shortest value of the period during which the power source of the power source control apparatus is not set to the off state even if the power source control apparatus is not executing the job from a time when the power source is set to the on state, the shortest activated period being set to prevent frequent switching between the on state and the off state conducted by the node;
select a period that is allocated to each of the plurality of nodes from among the plurality of period candidates based on the amount of reduction of power consumption; and
execute, for each of the plurality of nodes, control to set the power source to an off state when the idle period becomes the selected period or more.

11. The power source control apparatus according to claim 10,
wherein the processor is configured to select, for each of the plurality of nodes, a period in which the amount of reduction of power consumption becomes maximum from among the plurality of period candidates.

12. The power source control apparatus according to claim 10, wherein the processor is configured to:
extract, for each of the plurality of nodes, a period in which the amount of reduction of power consumption becomes a predetermined value or more from the plurality of period candidates; and
select any of the extracted periods.

13. The power source control apparatus according to claim 10,
wherein the shortest activated period is per node.

14. A non-transitory computer-readable storage medium storing a program that causes a processor included in a power source control apparatus to execute a process, the process comprising:
setting a plurality of period candidates indicating candidates in a predetermined period used when the power source is set to an off state when a procedure is not executed in the predetermined period;
calculating, for each of a plurality of nodes, an average Interval of idle periods having a length of the predetermined period or more in which the procedure is not executed for each of the plurality of period candidates, based on operation record information that indicates history of procedures that are executed in the plurality of nodes;
calculating, for each of the plurality of period candidates, an amount of reduction of power consumption based on the average interval of idle periods, an amount of power consumption of each one of the plurality of nodes in an idle period during which a job is not executed by the node, and a shortest activated period that indicates a period that is a shortest value of the period during which the power source of the power source control apparatus is not set to the off state even if the power source control apparatus is not executing the job from a time when the power source is set to the on state, the shortest activated period being set to prevent frequent switching between the on state and the off state conducted by the node;

selecting a period that is allocated to each of the plurality of nodes from among the plurality of period candidates based on the amount of reduction of power consumption; and executing, for each of the plurality of nodes, control to set the power source to an off state when the idle period becomes the selected period or more.

* * * * *